Figure 1:
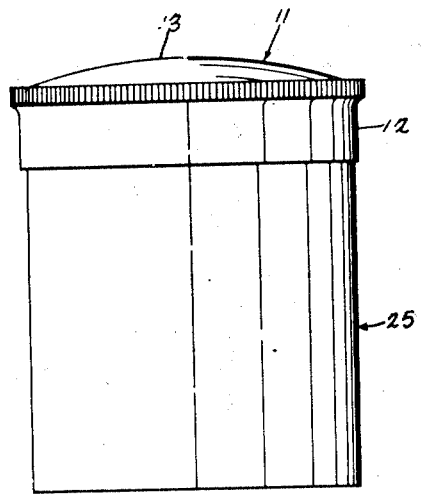

Dec. 27, 1927.

C. A. ZAROBSKY 1,654,066

CLOSURE

Filed July 23, 1926

Charles A. Zarobsky
Inventor by Smith and Freeman
Attorneys

Patented Dec. 27, 1927.

1,654,066

UNITED STATES PATENT OFFICE.

CHARLES A. ZAROBSKY, OF CLEVELAND, OHIO, ASSIGNOR TO THE SIMPLEX CAP COMPANY, OF CLEVELAND, OHIO, A CORPORATION OF OHIO.

CLOSURE.

Application filed July 23, 1926. Serial No. 124,354.

Figure 2:
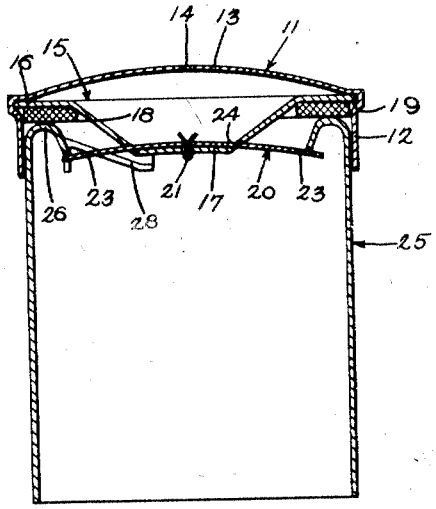
Figure 3:
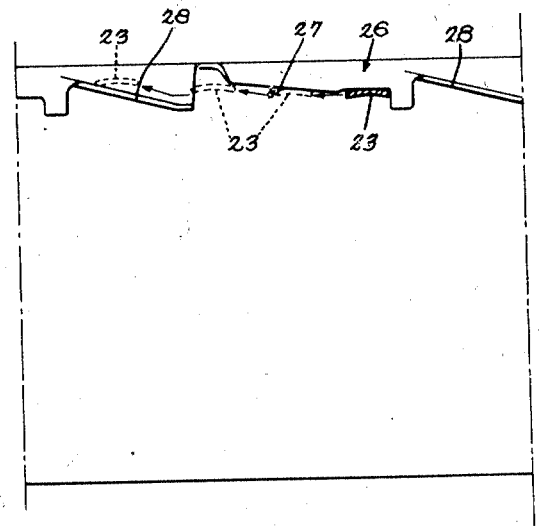

My invention relates to closures, and particularly to means for securing a closure in position, and the principal object of my invention is to provide new and improved means of this type. In the drawings accompanying this specification and forming a part of this application I have shown, for purposes of illustration, one form which my invention may assume. In these drawings:

Figure 1 is a side elevation showing this illustrative embodiment of my invention with a closure in position thereon, Figure 2 is a section on the line 2—2 of Figure 1, while Figure 3 is a panoramic view of a portion of the tube showing in more detail the embodiment of my invention herein disclosed.

The embodiment of my invention herein disclosed is illustrated as used in connection with a cap 11 provided with a depending portion 12 arranged to overlie the upper end of the tube or stem to be closed, with a concave top 13 centrally apertured at 14, and interiorly with a plate member 15 having its marginal portion 16 abutting the marginal portion of the top 13 of the cap 11, having its central portion 17 concaved away from the top 13 of the cap 11, having its central portion 17 and its marginal portion 16 connected by an intermediate conical portion 18, and secured in position in the cap 11 in an annular recess 19 formed by rolling in the depending portion 12 of the cap 11. The cap 11 also comprises a spring member 20 mounted within the cap 11, secured in position by means of a pin 21 extending through cooperating apertures in the spring member 20 and the central portion 17 of the plate member 15, and provided with a plurality of arms 23 extending outwardly through apertures 24 in the conical portion 18 of the plate member 15 and arranged to cooperate with the slot or cam portions of a bayonet joint carried on the inner surface of the tube or stem which the closure is to overlie and close.

The embodiment of my invention herein shown comprises a tube 25 provided at its upper end with a turned-over flange 26 having a series of cam surfaces 27 each forming a bayonet joint means arranged to cooperate with one of the arms 23 on the spring member 20 of the cap 11 to secure the cap 11 in position upon the tube 25, and provided also with a series of cam surfaces 28 arranged, upon a continuation of the unlocking relative rotation of the cap 11 and tube 25, to engage beneath the arms 23 of the spring member 20 of the cap 11 to advance the cap 11 and tube 25 from the relative position wherein they are free for relative longitudinal separation to a further position where they have been actually longitudinally separated.

From the above description it will be obvious to those skilled in the art that I have provided securing means not only effective to secure the cap in position upon the tube but also effective to completely separate the cap and the tube by a mere continuation of the unlocking relative rotation of the cap and the tube. It will therefore be understood that I have provided new and improved securing means for securing a closure in position. At the same time, it will also be understood by those skilled in the art that the particular embodiment of my invention herein shown and described may be variously changed and modified without departing from the spirit of my invention or sacrificing the advantages thereof, and it will therefore be understood that the disclosure herein is illustrated only and that my invention is not limited thereto.

I claim:

1. Means for securing a closure cap having a depending skirt to a tubular member comprising: lugs on said cap, an inwardly turned flange on the end of said tubular member, relatively slow pitch cam means on said flange for engagement with said lugs upon relative rotary movement of said closure and said tubular member for drawing said cap into engagement with said tubular member, and elongated cams of relatively slow pitch extending at right angles to said flange and adapted upon reverse relative rotary movement of said cap and said tubular member to engage under said lugs for raising said cap off of said tubular member.

2. Means for securing a closure cap to a tubular member comprising: a separable plate attached to said cap to provide attaching lugs, an inwardly turned flange on the end of said tubular member, relatively slow pitch cam means on said flange for engagement with said lugs upon relative rotary movement of said closure and said tubular member for drawing said cap into engagement with said tubular member, and elongated cams of relatively slow pitch extending at right angles to said flange and adapted upon reverse relative rotary movement of said cap and said tubular member to engage under said lugs for raising said cap off of said tubular member.

In testimony whereof I hereunto affix my signature.

CHAS. A. ZAROBSKY.